US012770059B2

(12) United States Patent
Xiao et al.

(10) Patent No.: US 12,770,059 B2
(45) Date of Patent: Oct. 20, 2026

(54) SCALABLE WAVELET TRANSFORMER-BASED FEATURE EXTRACTION

(71) Applicant: Microsoft Technology Licensing, LLC, Redmond, WA (US)

(72) Inventors: Qiang Xiao, Sunnyvale, CA (US); Haichao Wei, Santa Clara, CA (US); Hideyuki Winston Inada, San Jose, CA (US); Chengming Jiang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 948 days.

(21) Appl. No.: 18/155,734

(22) Filed: Jan. 17, 2023

(65) Prior Publication Data

US 2024/0242114 A1 Jul. 18, 2024

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 3/09; G06N 3/084; G06N 3/045; G06N 3/047
See application file for complete search history.

(56) References Cited

U.S. PATENT DOCUMENTS

2014/0036054 A1* 2/2014 Zouridakis ............ G06T 7/0012 382/110
2020/0349411 A1* 11/2020 Luo ...................... G06N 3/0464
2023/0281757 A1* 9/2023 Zhang ................... G06T 3/4007
2024/0169488 A1* 5/2024 Liu ........................... G06T 5/70

OTHER PUBLICATIONS

International Preliminary Report on Patentability received for PCT Application No. PCT/US2024/010093, mailed on Jul. 31, 2025, 15 pages.
Dosovitskiy, et al., "An Image is Worth 16x16 Words: Transformers for Image Recognition at Scale", In repository of arXiv:2010.11929v1, Oct. 22, 2020, 21 Pages.
Li, et al., "Wavelet Integrated CNNs for Noise-Robust Image Classification", In repository of arXiv:2005.03337v2, Jul. 14, 2020, 17 Pages.
Pan, et al., "Scalable Vision Transformers with Hierarchical Pooling", In repository of arXiv:2103.10619v2, Aug. 18, 2021, 11 Pages.
Vaswani, et al., "Attention Is All You Need", In repository of arXiv:1706.03762v5, Dec. 6, 2017, 15 Pages.

(Continued)

*Primary Examiner* — Dave Misir
(74) *Attorney, Agent, or Firm* — NICHOLSON DE VOS WEBSTER & ELLIOTT LLP

(57) ABSTRACT

Methods, systems, and apparatuses include receiving digital data. Embedded patches are generated using digital data. A transformed patch is generated by applying a transformer block to an embedded patch. Filtered patches are created for the transformed patch by applying wavelet filters to the transformed patch. A combined patch is created by combining the filtered patches. A set of training data is generated using the combined patch. A trained prediction model is generated by applying a prediction model to the set of training data.

20 Claims, 9 Drawing Sheets

(56) References Cited

OTHER PUBLICATIONS

Zhao, et al., "Wavelet-Attention CNN for Image Classification", In repository of arXiv:2201.09271v1, Jan. 23, 2022, 17 Pages.
Chen, et al., "Dpt: Deformable patch-based transformer for visual recognition." In Proceedings of the 29th ACM International Conference on Multimedia, Oct. 2021, pp. 2899-2907.
International Search Report and Written Opinion received for PCT Application No. PCT/US24/10093, May 6, 2024, 20 pages.
Yao, et al., "Wave-vit: Unifying wavelet and transformers for visual representation learning." In European Conference on Computer Vision, 2022, pp. 328-345.

* cited by examiner

SCALABLE WAVELET TRANSFORMER-BASED FEATURE EXTRACTION

TECHNICAL FIELD

The present disclosure generally relates to machine learning models, and more specifically, relates to feature extraction for machine learning models.

BACKGROUND

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
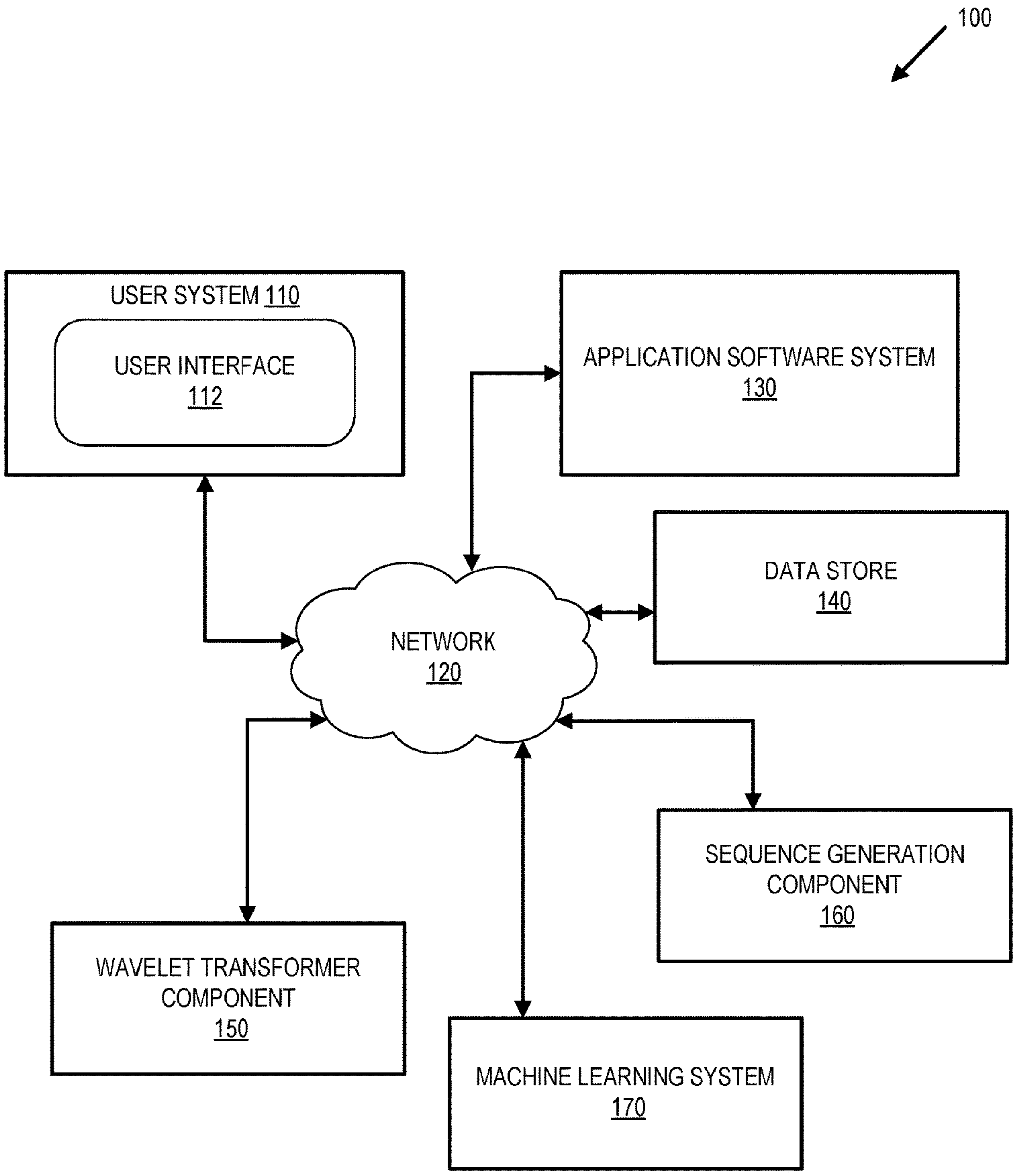
FIG. 1 illustrates an example computing system 100 that includes a wavelet transformer component 150 and a sequence generation component 160 in accordance with some embodiments of the present disclosure.

Aspects of the present disclosure are directed to feature extraction using scalable wavelet transformers. The disclosed methods are useful for extracting features from digital data such as audio, images, text, video, or multimodal data, for purposes of training and/or operating machine learning models and/or creating compressed versions of the digital data.

In some cases, the input data (also referred to as features) used to train machine learning models include data sets that contain raw data, such as digital audio files, video files, image files or text files. In other cases, data sets containing raw data are not used as the input data (or features) but instead are processed using one or more computational techniques to create the input data (or features) that are used to train machine learning models. As data sets become larger and larger and as there are an ever-increasing number of data sets available, the preparation of machine learning model inputs (i.e., features) increasingly strains computing resources.

For example, if a particular data set is not represented in the inputs used to train a machine learning model, the trained machine learning model is unable to generate statistically reliable outputs for that data set. For instance, if the data set used to train a machine learning model only includes images of cats, then at inference time the machine learning model will not be able to classify images of dogs as dogs but rather might label images of dogs as "not cats." Thus, the size, number and diversity of data sets used in training are often strongly correlated with a machine learning model's predictive reliability. However, as the size, number, and diversity of training data sets increases, both the training and inference processes of the prior machine learning model approaches, such as convolutional neural network-based approaches, become slower and less efficient.

The traditional way to improve speed and efficiency for machine learning models is to employ conventional transformers that can perform parallel processing of model inputs, but which do not use wavelet functions in conjunction with the parallel processing. However, conventional transformers, which are not scalable wavelet transformers, are paired with kernel operations. The kernel operations lose information during the transformation process performed by the conventional transformer. For example, a kernel operation is limited by the kernel size and can therefore only capture either local features or global features, but not both local features and global features. For example, because a kernel is of a set size, the conventional transformers only learn features for the specific kernel size (e.g., a large kernel extracts only global features while a small kernel extracts only local features). Local features include, for example, data patterns in small segments of data (e.g., a pattern of fur on a dog's head in a picture of the dog) whereas global features are data patterns in larger segments of data (e.g., the outline of the entire dog's body).

As a result, using conventional transformer approaches that do not use scalable wavelet transformers, either local features or global features are excluded from the machine learning model training. Additionally, even if a particular data set is included in the training, the kernel operations may only select certain values of the data set and discard the rest. As a result, potentially valuable training data is lost. Because data values are discarded, this loss of information during model training is irreversible. Because the loss of information is irreversible, the machine learning model would need to be retrained with training data that reflects the lost information.

Aspects of the present disclosure address the above and other deficiencies by configuring scalable wavelet transformers to perform feature extraction (e.g., the process of extracting features from data sets). By using multiple layers of wavelet filters as well as transformers, the machine learning system is able to learn more comprehensive information about the system because both local and global features can be used instead of just local features or just global features and both spectral and temporal features can be used instead of just spectral or temporal features). As a result, the disclosed feature extraction techniques produce features that contain both spectral and temporal features as well as both local and global features. For example, spectral features are data features in the frequency domain (e.g., patterns in the frequency of pixel colors in an image; for instance, the color green occurs ten time more often than the color red in a particular segment of an image), whereas temporal information is information about the data in the time domain (e.g., the pattern of the actual pixels making up the image; e.g., green appears in one segment but not in another, neighboring segment of an image).

The disclosed approaches improve upon conventional approaches because they enable reversible wavelet transformation operations that can extract both spectral and temporal features (e.g., without omitting either the spectral features or the temporal features) as well as both local and global features (e.g., without omitting either the local features or the global features). For example, conventional transformers using kernel operations lose information in the kernel operations whereas wavelet filters preserve the information and can therefore be reversed. The improvements to feature extraction, which are provided by the disclosed approaches but not by the prior approaches, improve the efficiency of the training process on large data sets and enable the trained machine learning models to produce statistically reliable predictive outputs without sacrificing speed or efficiency. As a result, the disclosed approaches can be utilized in resource constrained computing environments as well as non-resource constrained environments.

In the embodiment of FIG. 1, computing system 100 includes a user system 110, a network 120, an application software system 130, a data store 140, a wavelet transformer component 150, a sequence generation component 160, and a machine learning system 170. Each of these components of computing system 100 is described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by wavelet transformer component 150, sequence generation component 160, and/or machine learning system 170. Examples of application software system 130 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Data store 140 can include any combination of different types of memory devices. Data store 140 stores digital data used by user system 110, application software system 130, wavelet transformer component 150, sequence generation component 160, and machine learning system 170. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Figure 9:
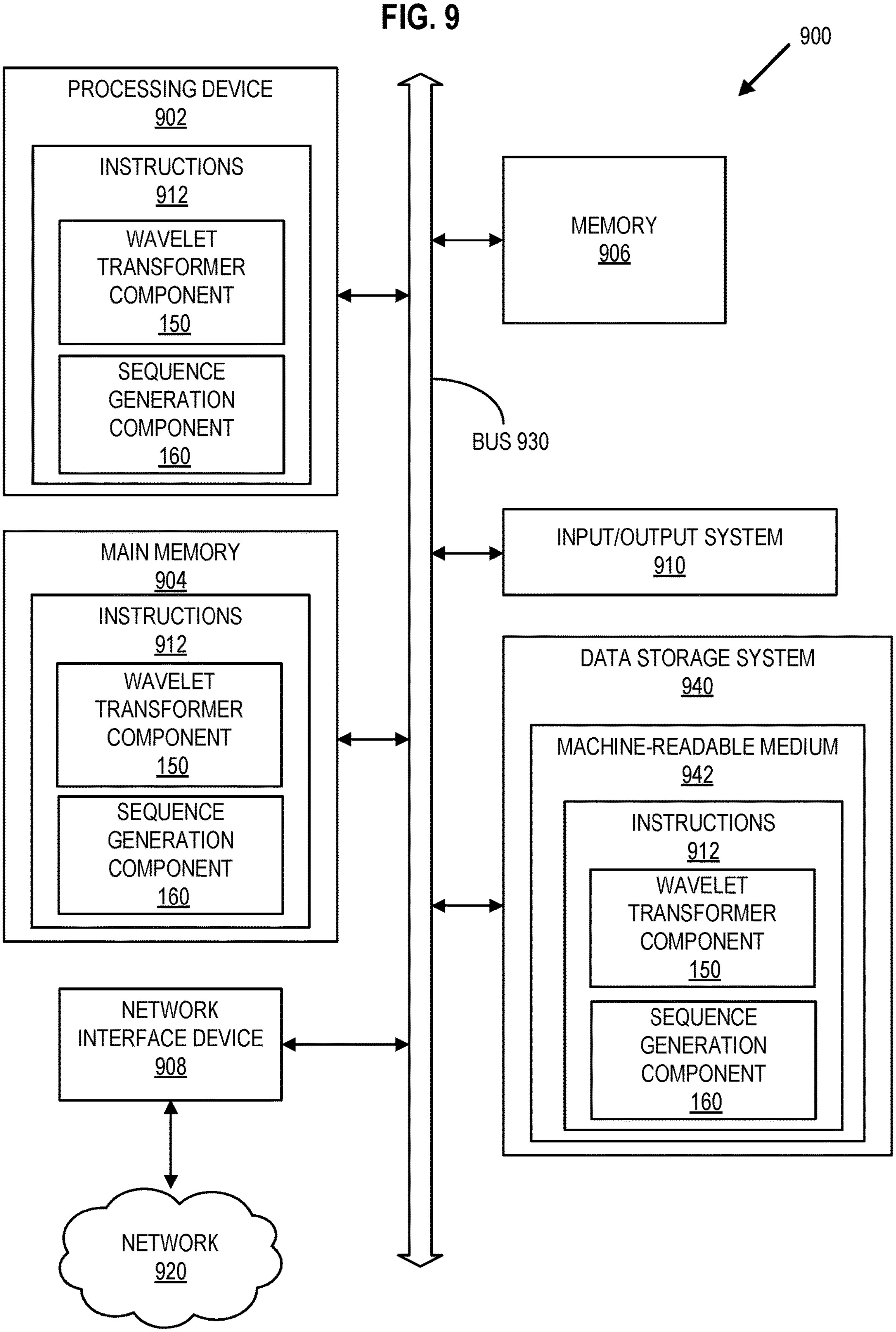
FIG. 9 is a block diagram of an example computer system in which embodiments of the present disclosure can operate.

The computing system 110 includes a wavelet transformer component 150 that can apply wavelet transforms to digital data for the purpose of extracting features of the digital data. In some embodiments, the application software system 130 includes at least a portion of the wavelet transformer component 150. As shown in FIG. 9, the wavelet transformer component 150 can be implemented as instructions stored in a memory, and a processing device 902 can be configured to execute the instructions stored in the memory to perform the operations described herein.

The wavelet transformer component 150 can apply wavelet transforms to digital data and extract features for use in machine learning models. The disclosed technologies can be described with reference to an example use case of transforming data for image classification for use in a ranking machine learning model; for example, ranking search results including classified images in a social graph application such as a professional social network application. The disclosed technologies are not limited to social graph applications but can be used to compress and classify data more generally. The disclosed technologies can be used by many different types of network-based applications in which compression and/or classification are useful. For example, data compression, image captioning, nature language processing, image classification, and content moderation.

The computing system 110 includes a sequence generation component 160 that can generate sequences from digital data for use in feature extraction of the digital data. In some embodiments, the application software system 130 includes at least a portion of the sequence generation component 160. As shown in FIG. 9, sequence generation component 160 can be implemented as instructions stored in a memory, and a processing device 902 can be configured to execute the instructions stored in the memory to perform the operations described herein.

The sequence generation component 160 can divide digital data into patches and generate sequences using the patches of divided data. Patches are subdivisions of digital data (e.g., a group of pixels in an image file) used as inputs into a sequence generation component (e.g., sequence generation component 160) for subsequent transformation operations. Sequences are patches with positional embeddings used as inputs into a transformer component (e.g., wavelet transformer component 150). Further details with regard to the definition and use of patches and sequences are described with reference to FIGS. 2, 3, and 4. The disclosed technologies can be described with reference to an example use case of generating sequences for images classified for use in a ranking machine learning model; for example, ranking search results including images in a social graph application such as a professional social network application. The disclosed technologies are not limited to social graph applications but can be used to compress and classify data more generally. The disclosed technologies can be used by many different types of network-based applications in which compression and/or classification are useful. For example, data compression, image captioning, nature language processing, image classification, and content moderation.

Further details with regards to the operations of the wavelet transformer component 150 and sequence generation component 160 are described below.

Each of user system 110, application software system 130, data store 140, wavelet transformer component 150, sequence generation component 160, and machine learning system 170 is implemented using at least one computing device that is communicatively coupled to electronic communications network 120. Any of user system 110, application software system 130, data store 140, wavelet transformer component 150, sequence generation component 160, and machine learning system 170 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, wavelet transformer component 150, sequence generation component 160, and machine learning system 170. User system 110 is configured to communicate bidirectionally with any of application software system 130, data store 140, wavelet transformer component 150, sequence generation component 160, and machine learning system 170 over network 120.

While not specifically shown, it should be understood that any of user system 110, application software system 130, data store 140, wavelet transformer component 150, sequence generation component 160, and machine learning system 170 includes an interface embodied as computer programming code stored in computer memory that when executed causes a computing device to enable bidirectional communication with any other of user system 110, application software system 130, data store 140, wavelet transformer component 150, sequence generation component 160, and machine learning system 170 using a communicative coupling mechanism. Examples of communicative coupling mechanisms include network interfaces, inter-process communication (IPC) interfaces and application program interfaces (APIs).

The features and functionality of user system 110, application software system 130, data store 140, wavelet transformer component 150, sequence generation component 160, and machine learning system 170 are implemented using computer software, hardware, or software and hardware, and can include combinations of automated functionality, data structures, and digital data, which are represented schematically in the figures. User system 110, application software system 130, data store 140, wavelet transformer component 150, sequence generation component 160, and machine learning system 170 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Figure 2:
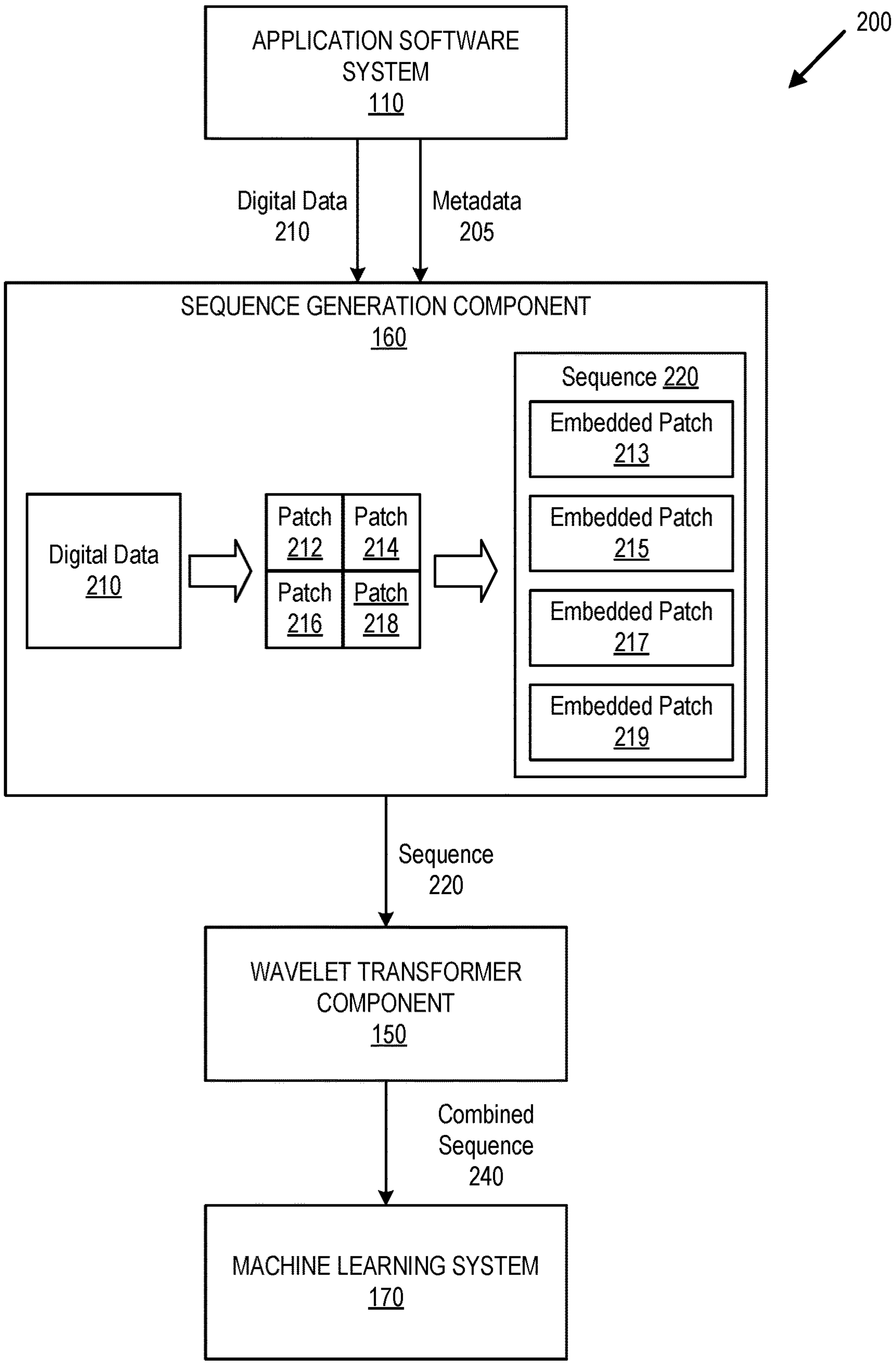
FIGS. 2 and 3 illustrate an example computing system 200 that includes a wavelet transformer component 150 and a sequence generation component 160 in accordance with some embodiments of the present disclosure.

FIG. 2 illustrates an example computing system 200 that includes a wavelet transformer component 150 and a sequence generation component 160 in accordance with some embodiments of the present disclosure. In the embodiment of FIG. 2, computing system 200 includes an application software system 130, a wavelet transformer component 150, a sequence generation component 160, and a machine learning system 170. Example computing system 200 is illustrated for ease of discussion and may include additional elements not explicitly shown (e.g., user system 110, network 120, and data store 140 of FIG. 1).

As shown in FIG. 2, application software system 110 sends digital data 210 to sequence generation component 160. Digital data 210 can include one or more of audio, text, image, and/or video data. For example, digital data 210 can include a message including an image as well as text. In some embodiments, sequence generation component 160 receives digital data 210 and metadata 205 from a data store, such as data store 140 of FIG. 1. Metadata 205 may contain information about the data type of digital data 210 as well as other aspects of digital data 210. For example, metadata 205 contains information about font sizes for text in digital data 210. Sequence generation component 160 receives digital data 210 and prepares digital data 210 for sequence generation. For example, sequence generation component 160 divides digital data 210 into patches 212, 214, 216, and 218. In one embodiment, digital data 210 is an image file and patches 212, 214, 216, and 218 are groups of pixels making up digital data 210. In some embodiments, the number of patches is predetermined, and the size of the patches depends on the predetermined number of patches and the size of digital data 210. For example, digital data 210 is an image file and is divided into four patches. In other embodiments, the size of the patches is predetermined, and the number of patches depends on the predetermined size of patches and the size of digital data 210. For example, digital data 210 is an image file and is divided into patches of a given number of pixels. Although only four patches are illustrated for ease of description, any number of patches may be used.

In some embodiments, sequence generation component determines the size and/or number of patches 212, 214, 216, and 218. For example, sequence generation component 160 receives metadata 205 from application software system 110 and uses metadata 205 to determine the size and/or number of patches 212, 214, 216, and 218. In some embodiments, metadata 205 includes a data type and sequence generation component 160 uses the data type to determine the size and/or number of patches 212, 214, 216, and 218. For example, the patch size for an image may be predetermined while sequence generation component 160 determines the patch sizes for text (e.g., determines a patch as a subdivision of the text such as determining a patch for each word or sentence with different size patches corresponding to different word or sentence lengths). In some embodiments, digital data 210 includes multiple data types and sequence generation component 160 separates the different data types of digital data 210 using metadata 205.

In some embodiments, digital data 210 includes video data and sequence generation component 160 samples the video data and divides each sample of the video data into patches. In some embodiments, sequence generation component 160 randomly samples the video data. In other embodiments, sequence generation component 160 uses a representative sample (e.g., a thumbnail) to represent the video. In still other embodiments, sequence generation component 160 samples the video data at a certain rate (e.g., ten samples per second of video).

In some embodiments, digital data 210 includes text data and sequence generation component 160 prepares the text data for sequence generation by performing tokenization on the patches containing text data (e.g., patches 212, 214, 216, and 218) to transform the text data into a numerical representation that can be processed by wavelet transformer component 150 (e.g., a one-hot encoded numerical 2D array).

Sequence generation component 160 performs a positional embedding operation on patches 212, 214, 216, and 218 to determine positional embeddings for each of patches 212, 214, 216, and 218 and combine the positional embeddings with their associated patches to generate embedded patches 213, 215, 217, and 219. For example, the positional embedding for patch 212 includes information about the position of patch 212 in the larger set of digital data 210 (e.g., identifying its place in the top left corner). The positional embedding therefore contains information about where each patch fits in the larger set of digital data 210. This positional information is useful for understanding context for the patches since wavelet transformer component 150 does not process embedded patches 213, 215, 217, and 219 sequentially. For example, digital data 210 is an image and patches 212, 214, 216, and 218 are groups of pixels in the image. The placement of the groups of pixels in the image is tracked by positional embeddings such that embedded patches 213, 215, 217, and 219 contains information on the groups of pixels as well as their location with the picture.

Sequence generation component 160 combines embedded patches 213, 215, 217, and 219 to produce sequence 220. Sequence 220 represents the original digital data 210 split into smaller patches with associated positional embeddings. By producing sequence 220, sequence generation component 160 is able to preserve local features expressed in each of the patches 212, 214, 216, and 218 while also preserving global features expressed in digital data 210 and preserved through the positional embeddings. For example, sequence 220 includes global features since sequence 220 includes all data in digital data 210 (with positions indicated through positional embeddings) but also include local features since sequence 220 is made up of subdivisions of digital data 210 (e.g., patches 212, 214, 216, and 218). Sequence generation component 160 sends sequence 220 to wavelet transformer component 150. In some embodiments, sequence generation component 160 sends embedded patches 213, 215, 217, and 219 to wavelet transformer component 150 rather than sequence 220.

Figure 3:
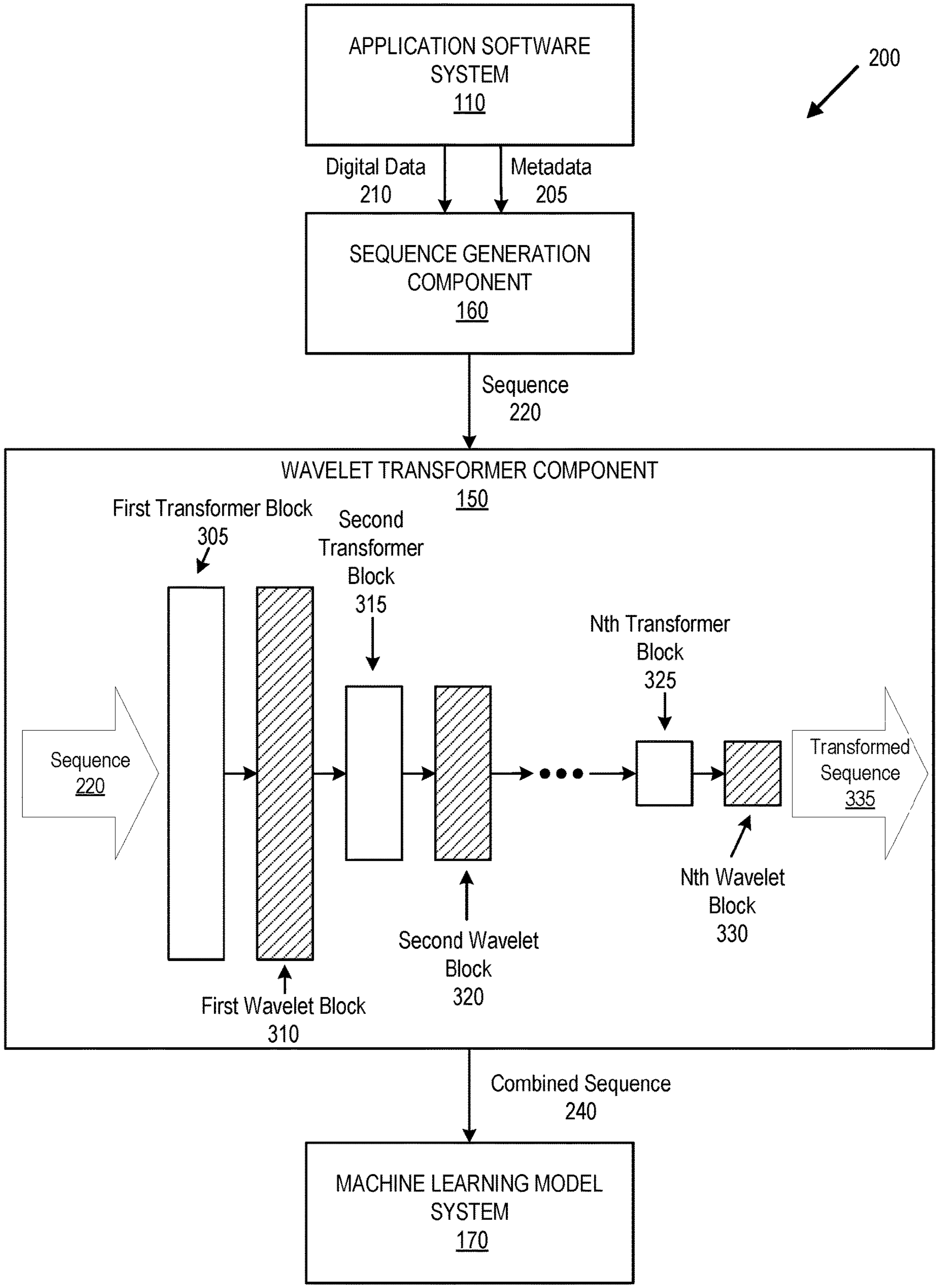

FIG. 3 illustrates the example computing system 200 of FIG. 2 that includes a wavelet transformer component 150 and a sequence generation component 160 in accordance with some embodiments of the present disclosure. In the embodiment of FIG. 3, wavelet transformer component 150 includes first transformer block 305 and second through Nth transformer blocks 315 and 325 as well as first wavelet block 310 and second through Nth wavelet blocks 320 and 330. A wavelet transformer is a combination of a transformer component with a wavelet filter such that the input sequence is passed through a transformer with a subsequent application of one or more wavelet filters. In some embodiments, a wavelet transformer contains multiple layers of transformers and wavelet filters.

As shown in FIG. 3, wavelet transformer component 150 inputs sequence 220 into first transformer block 305. For example, wavelet transformer component 150 sends embedded patches through transformer block 305. In some embodiments, wavelet transformer component 150 adds a learnable classification embedding to sequence 220 before inputting sequence 220 into first transformer block 305. The learnable classification embedding is a variable which the transformer block updates along with the weights which identifies one or more classifications for the digital data. For example, the learnable classification embedding at the end of the transformation process can identify an image as including a dog. Each transformer block includes a deep learning model that uses self-attention to weigh the significance of portions of sequence 220. For example, embedded patches including the main subject of a picture have higher weights than embedded patches including background of a picture. First transformer block 305 is therefore able to determine relevant information in sequence 220 through self-attention while ignoring irrelevant information. In some embodiments, transformer blocks 305, 315, and 325 include layers of multiheaded self-attention. In some embodiments, transformer blocks 305, 315, and 325 include multilayer perceptron blocks. First transformer block 305 uses self-attention to generate attention weights for embedded patches 213, 215, 217, and 219. For example, the attention weights are based on the pairwise similarity between elements of sequence 220 and their respective representations. First transformer block 305 outputs transformed patches (e.g., transformed patch 405 of FIG. 4).

Wavelet transformer component 150 takes the output of first transformer block 305 (e.g., transformed patches) and inputs it into first wavelet block 310. First wavelet block 310 receives transformed patches of sequence 220 and performs wavelet compression on sequence 220 to reduce the size of sequence 220. For example, as shown in FIG. 3, the size of second transformer block 315 is smaller than first transformer block 305 because first wavelet block 310 compressed sequence 220 to a smaller size. Further details of first wavelet block 310 and second through Nth wavelet blocks 320 and 330 are described with reference to FIG. 4. Although illustrated with more than three transformer/wavelet block pairs, wavelet transformer component 150 can include different numbers of transformer/wavelet block pairs. Wavelet transformer component 150 sends combined sequence 240 to machine learning system 170. Further details of machine learning system 170 are described with reference to FIG. 5.

Figure 4:
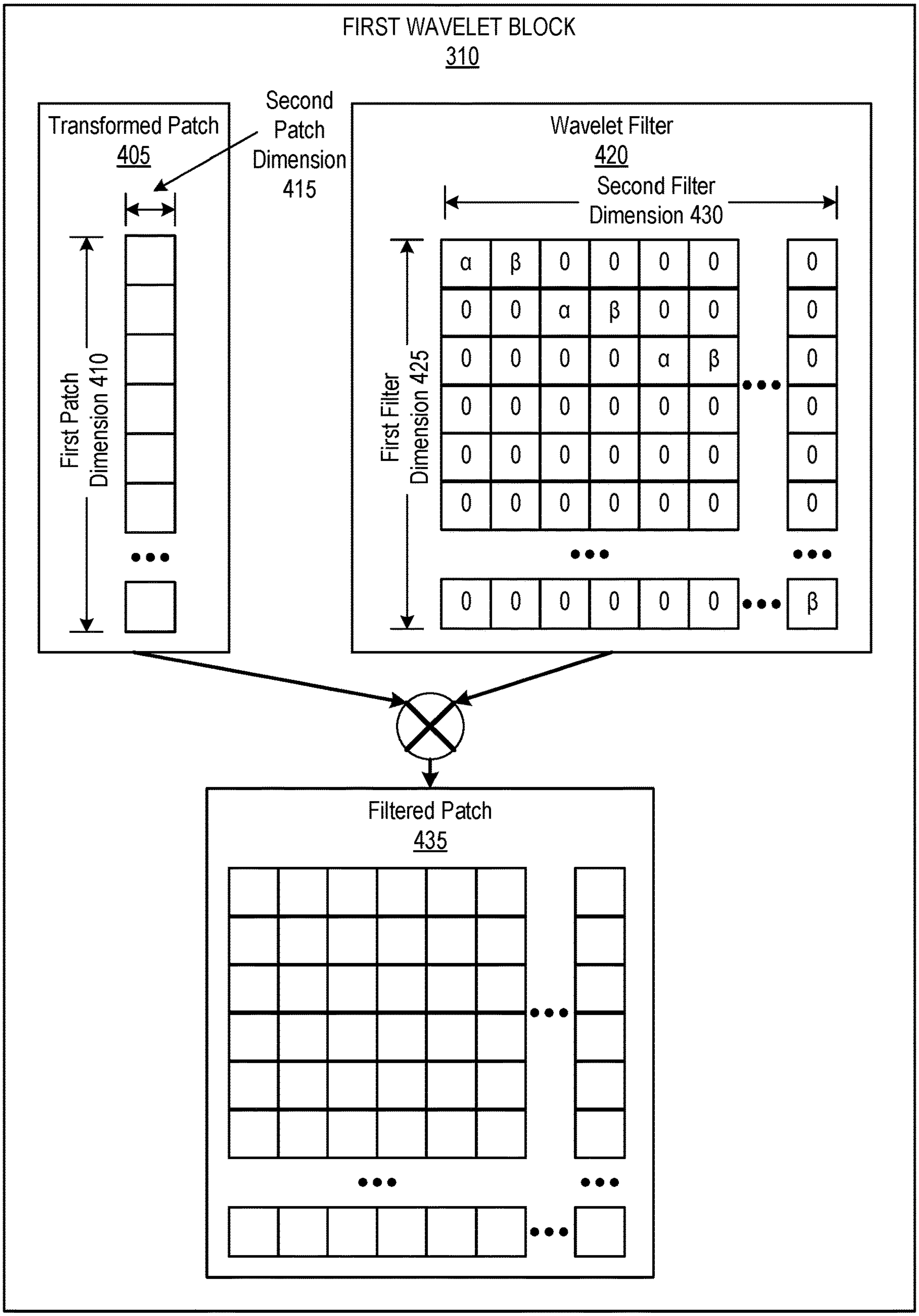
FIG. 4 illustrates an example wavelet transformer component 150 in accordance with some embodiments of the present disclosure.

FIG. 4 illustrates an embodiment of first wavelet block 310 including transformed patch 405, wavelet filter 420, and filtered patch 435. As shown in FIG. 4, transformed patch 405 includes a first patch dimension 410 and a second patch dimension 415. Similarly, wavelet filter 420 includes a first filter dimension 425 and a second filter dimension 430. Although second patch dimension 415 is illustrated as a single dimension, second patch dimension can be multidimensional. In some embodiments, transformed patch 405 is a vector of length N. For example, first patch dimension 410 is N and second patch dimension 415 is 1.

In some embodiments, wavelet filter 420 includes a high pass and/or a low pass wavelet filter. In embodiments where wavelet filter 420 includes a low pass wavelet filter, wavelet filter 420 attenuates sudden changes in the input creating an averaged output (as an illustrative example imagine blurring the edges of an image). In embodiments where wavelet filter 420 includes a high pass wavelet filter, wavelet filter 420 accentuates the sudden changes in the input (e.g., an edge detector). In embodiments where both a low pass and a high pass filter are used, the subsequent applications of transformer and wavelet blocks (as illustrated in FIG. 2) allow the transformers to classify digital data based both on the averaged out result of the low pass filter and the edge accentuator of the high pass filter. This combination allows the transformers to have a better comprehensive understanding of the image including both the general idea (e.g., averaged data) as well as more specific information (e.g., edges).

In some embodiments, as illustrated in FIG. 4, wavelet filter 420 is a cyclic matrix. For example, wavelet filter 420 is a diagonal constant matrix with values α and β across diagonals of wavelet filter 420. In some embodiments, values for α and β in wavelet filter 420 are chosen based on a type of wavelet. For example, wavelet filter 420 can be a Haar or Daubechie wavelet. Although illustrated as including only two filter values α and β, wavelet filter 420 may have any number of filter values. For example, wavelet filter 420 includes filter values $\alpha_1$, $\alpha_2$, $\alpha_3$, and $\alpha_4$ as well as corresponding filter values $\beta_1$, $\beta_2$, $\beta_3$, and $\beta_4$. In some embodiments with multiple filter values, the values of α values are set such that $\alpha_1^2+\alpha_2^2+\alpha_3^2+\alpha_4^2=1$ and such that $\alpha_1+\alpha_2+\alpha_3+\alpha_4=\sqrt{2}$. Similarly, the β values may be set such that $\beta_1=\alpha_4$; $\beta_2=-\alpha_3$; $\beta_3=\alpha_2$; and $\beta_4=-\alpha_1$ and such that $\beta_1+\beta_2+\beta_3+\beta_4=0$ and $\beta_1^2+\beta_2^2+\beta_3^2+\beta_4^2=1$. In one embodiment, $\alpha_1=1+\sqrt{3}/4\sqrt{2}$, $\alpha_2=3\sqrt{3}/4\sqrt{2}$, $\alpha_3=3-\sqrt{3}/4\sqrt{2}$, and $\alpha_4=1-\sqrt{3}/4\sqrt{2}$, $\beta_1=1-\sqrt{3}/4\sqrt{2}$, $\beta_2=-3+\sqrt{3}/4\sqrt{2}$, $\beta_3=3+\sqrt{3}/4\sqrt{2}$, and $\beta_4=-1-\sqrt{3}/4\sqrt{2}$.

In some embodiments, the filter values of α and β are updated through backpropagation. For example, the values of α and β are updated in response to a machine learning model being trained (e.g., model building 515). In such an example, the filter values of α and β are updated based on the loss of a machine learning model (such as loss 535 of FIG. 5). In some embodiments, a larger loss corresponds to a larger change in the filter values of α and β. In some embodiments, filter values of α and β are updated through backpropagation as part of a pretraining process. For example, model building 515 updates filter values of α and β during pretraining of a classification model using backpropagation. The pretrained classification model may then be used as part of multiple other models, such as part of a recommender model. In some embodiments, filter values of α and β are updated through backpropagation as part of a finetuning process. For example, a machine learning system, such as machine learning system 170 of FIGS. 1 and 2 updates filter values of α and β during finetuning of a recommender model using backpropagation.

In some embodiments, first filter dimension 425 is less than first patch dimension 410 and second filter dimension 430 is the same as first patch dimension 410. For example, transformed patch 405 is a vector of length N with first patch dimension 410 of N and second patch dimension 415 of 1. In such embodiments, wavelet filter 420 is therefore a matrix of size N/2 by N.

In some embodiments, first wavelet block 310 transposes transformed patch 405 to line the dimensions of transformed patch 405 with the dimensions of wavelet filter 420 for matrix multiplication. For example, transformed patch 405 is represented as matrix A with dimensions N×1 and wavelet filter 420 is represented as matrix L with dimensions N/2×N. For a product to be defined for a matrix multiplication operation, first wavelet block 310 transposes matrix A before multiplication. For example, first wavelet block 310 constructs matrix B such that $B=/A^T$ and performs matrix multiplication to compute filtered patch 435 represented by matrix C, such that C=L·B. The resulting dimensions of filtered patch 435, represented by matrix C are therefore N/2 by 1 or half the size of transformed patch 405.

Although only one wavelet filter is illustrated, multiple wavelet filters may be used. For example, first wavelet block 310 includes a first wavelet filter used as a low pass filter and a second wavelet filter used as a high pass filter. Wavelet filter 420, represented by matrix L may therefore be a low pass filter and a second wavelet filter, not illustrated, is represented by matrix H as a high pass filter. In such embodiments, first wavelet block 310 performs matrix multiplication to compute a second filtered patch represented by matrix D, such that D=H·B. The resulting dimensions of the second filtered patch, represented by matrix D are therefore N/2 by 1, the same as the dimensions of filtered patch 435 and half the size of transformed patch 405. In this way, first wavelet block 310 compresses transformed patch 405 to be half its original size.

In some embodiments, first wavelet block 310 combines the filtered patches including filtered patch 435 to create a combined patch. For example, first wavelet block 310 uses softmax or a similar function to convert values of matrix D from numbers to probability values, where the probability values for each number is proportional to the relative scale of each value in matrix D. For example, first wavelet block 310 uses softmax to generate filtered probability patch matrix E, such that E=softmax(D). In some embodiments, first wavelet block 310 performs an element-wise product operation of matrix E with matrix C. For example, first wavelet block 310 performs a Hadamard product of matrix E with matrix C to generate a combined patch (e.g., a portion of combined sequence 240 of FIGS. 2 and 3). In some embodiments, first wavelet block 310 generates the combined patch by concatenating channels of the filtered patches. In other embodiments, first wavelet block 310 generates the combined patch by performing an algebraic sum on the filtered patches. In some embodiments, wavelet transformer component 150 creates combined sequence 240 by adding the combined patch associated with each patch (e.g., patches 212, 214, 216, and 218).

As explained with reference to FIG. 3, multiple transformer/wavelet block pairs may be used in a hierarchical sequence such that the output of one transformer/wavelet block pair is fed into the input of the next transformer/wavelet block pair. This allows digital data 210 to be continually compressed while retaining spectral and temporal information about the data. For example, because the transformer/wavelet block pairs are reversible, no information is lost during the transformation and filtering process. Additionally, this approach is scalable as wavelet filtering operations can be performed in parallel and additional transformer/wavelet block pairs may be added to increase compression.

Figure 5:
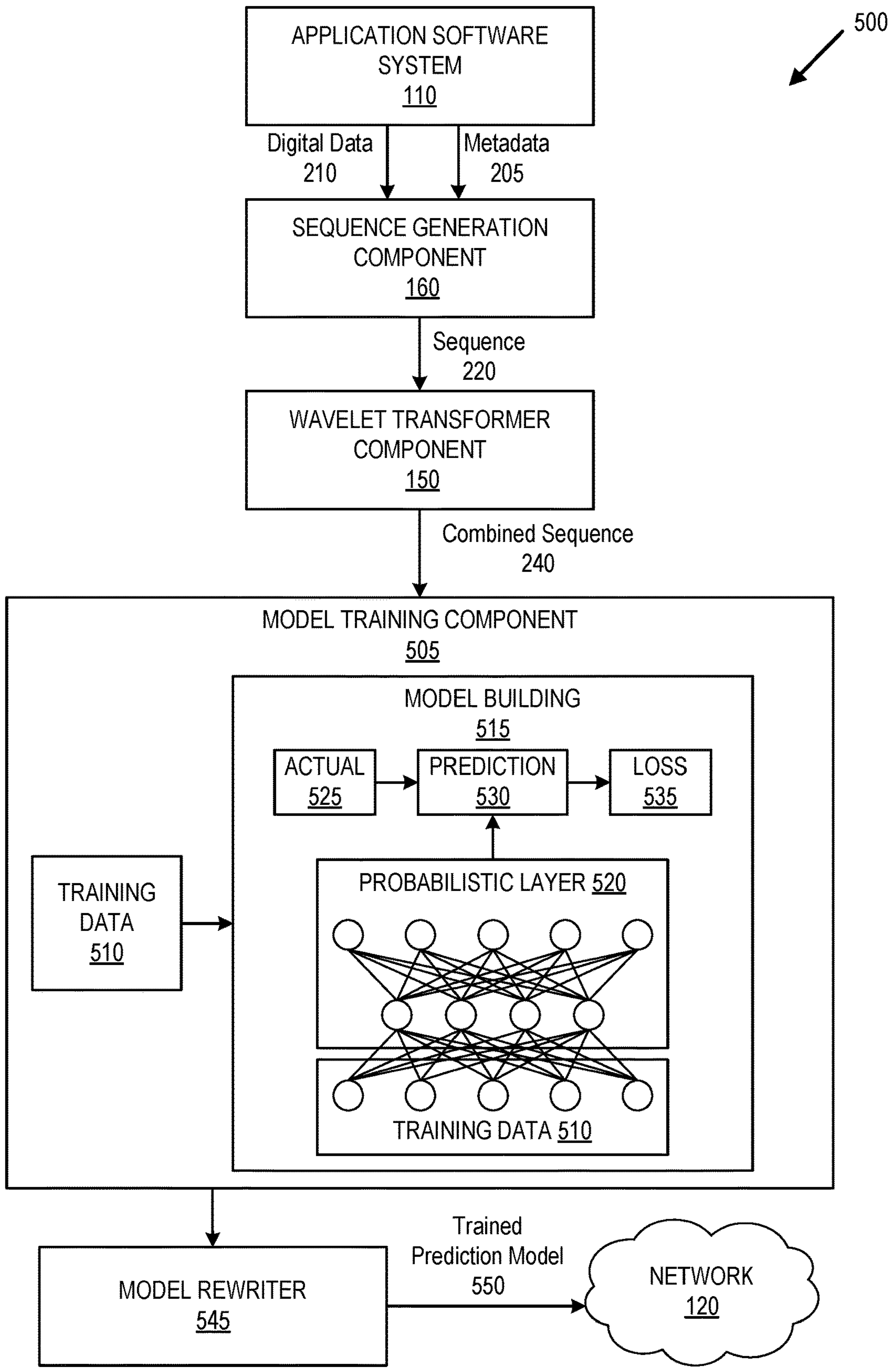
FIG. 5 illustrates an example computing system 500 that includes a wavelet transformer component 150, a sequence generation component 160, and portions of a machine learning system, in accordance with some embodiments of the present disclosure.

FIG. 5 illustrates an example computing system 500 that includes a wavelet transformer component 150 and a sequence generation component 160 in accordance with some embodiments of the present disclosure. In the embodiment of FIG. 5, example computing system 500 includes application software system 110, sequence generation component 160, wavelet transformer component 150, model training component 505, model rewriter 545, and network 120. Model training component 505 and model rewriter 545 may be included in a larger model learning system, such as machine learning system 170 of FIG. 1.

As shown in FIG. 5, wavelet transformer component 150 sends combined sequence 240 to model training component 505. Model training component 505 generates training data 510 including combined sequence 240 as well as one or more input classifiers identifying digital data 210 that combined sequence 240 was generated from. For example, digital data 210 is an image of a dog and model training component 505 generates training data 510 including combined sequence 240 as well as an input classifier indicating that digital data 210 includes a dog. Model training component 505 sends training data 510 to model building 515 and model building 515 builds a machine learning model.

In some embodiments, model building 515 is a component for training, validating, and executing a machine learning model. In some embodiments, model building 515 is a component for training, validating, and executing a neural network, such as a Bayesian neural network, which classifies inputs based on training data 510. For example, model building 515 uses training data 510 as inputs and creates a neural network with hidden layers such as probabilistic layer 520. Model building 515 generates prediction 530 using probabilistic layer 520. For example, model building 515 calculates gradients and applies backpropagation to training data 510. Prediction 530 is a predicted classification for training data 510. Model building 515 compares prediction 530 to actual 525 which is the actual classification for digital data 210. For example, training data 510 may include a transformed/filtered version of a picture of a dog with an associated classification.

Model building 515 generates loss 535 based on the difference between actual 525, the actual classification and prediction 530, the predicted classification. For example, model building 515 generates loss 535 based on whether the training data 510 is correctly classified with the one or more input classifiers associated with digital data 210 and therefore trains the machine learning model to identify the classification for digital data 210 based on its transformed/filtered version (e.g., combined sequence 240). In some embodiments, the loss is a validation loss. In some embodiments, model building 515 determines whether the validation loss (i.e., loss 535) satisfies a validation loss threshold. The validation loss threshold is a threshold that determines an acceptable accuracy for model building 515. In some embodiments, if the validation loss exceeds the validation loss threshold, model building 515 sends the trained prediction model 550 to model rewriter 545. In other embodiments, if the validation loss exceeds validation loss threshold, model building 515 sends the trained prediction model 550 to a model serving system through network 120.

In some embodiments model rewriter 545 receives trained prediction model 550 and rewrites the trained prediction model 550 to generate a new machine learning model with the same structure and weights as trained prediction model 550. In some embodiments, model rewriter 545 again rewrites the new machine learning model to generate a machine learning model to be served online. Model rewriter 545 sends the machine learning model to network 120 for distribution and execution.

Figure 6:
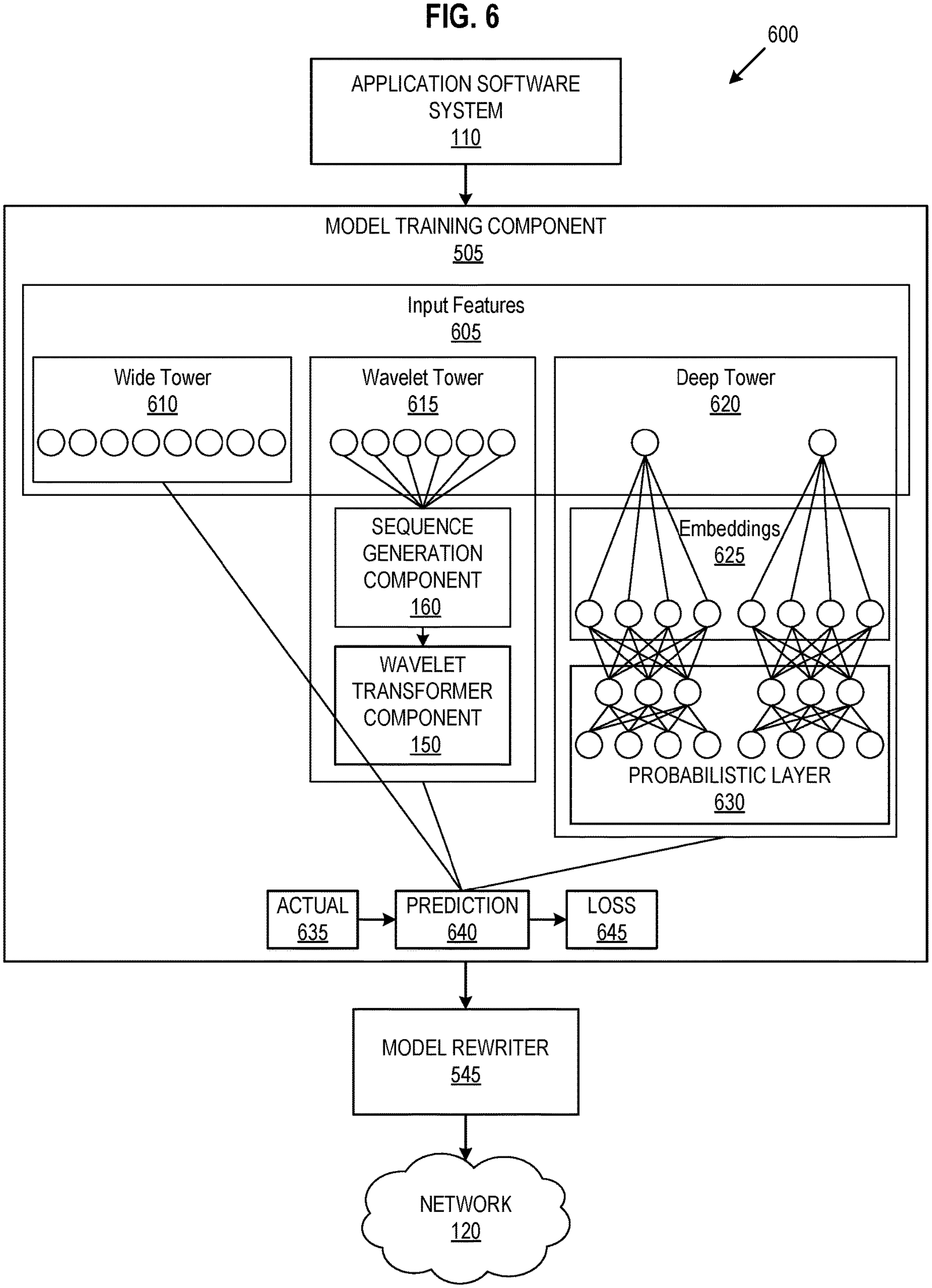
FIG. 6 illustrates an example computing system 600 that includes a wavelet transformer component 150, a sequence generation component 160, and portions of a machine learning system, in accordance with some embodiments of the present disclosure.

FIG. 6 illustrates an example computing system 600 that includes a wavelet transformer component 150 and a sequence generation component 160 in accordance with some embodiments of the present disclosure. In the embodiment of FIG. 6, example computing system 600 includes application software system 110, model training component 505, model rewriter 540, and network 120. Model training component 505 and model rewriter 545 may be included in a larger model learning system, such as machine learning system 170 of FIG. 1.

As shown in FIG. 6, model training component 505 can have multiple different towers (e.g., wide tower 610, wavelet tower 615, and deep tower 620) which all contribute to prediction 640. A tower of model training component 505 may be understood as an interior machine learning model lacking a final output. For example, each of wide tower 610, wavelet tower 615, and deep tower 620 is a separate machine learning model with its own weights but the outputs of wide tower 610, wavelet tower 615, and deep tower 620 can be considered intermediate outputs that are aggregated into a single final output (e.g., prediction 640). Although shown with three towers, model training component 505 can have any number of towers. Additionally, although wavelet tower 615 is illustrated as its own tower, sequence generation component 160 and wavelet transformer component 150 can also be included in deep tower 620. For example, inputs features 605 of deep tower 620 are fed into embeddings 625 which then inputs the embedded input features into sequence generation component 160 and wavelet transformer component 150 before being input into probabilistic layer 630 of deep tower 620.

In the embodiments of FIG. 6, model training component 505 uses a wide tower 610 and a deep tower 620 to achieve an optimal level of generalization in one model. For example, wide tower 610 is a linear model component and deep tower 620 is a feed-forward neural network component. In such an example, the feed-forward neural network of deep tower 620 allows for more generalization than a linear model because deep tower 620 learns more about the input features 605. For example, a recommender system using only a linear model would be able to recommend pictures of dogs to a user who likes dogs but may not generalize the recommendation to include animals in general. Deep tower 620 therefore allows for generalization of data that may not have necessarily been present in input features 605. Deep tower 620, however, can also have problems of overgeneralization when generalizations are not appropriate for input features 605. For example, a user of a recommender system may have a very niche interest in a certain breed of dog and deep tower 620 will tend to overgeneralize and recommend pictures of all breeds of dogs or even pictures of animals in general. Wide tower 610 learns these more specific cases with fewer parameters than deep tower 620.

Deep tower 620 includes an embeddings layer 625 and a probabilistic layer 630. For example, input features 605 of deep tower 620 are converted from high-dimensional features to a low-dimensional, real valued vector (i.e., embedded vector) in embeddings layer 625. In some embodiments, embeddings layer 625 sends the embedded vectors to probabilistic layer 630. Probabilistic layer 630 performs computations on the embedded vectors to generate model weights which are updated based on loss 645.

In some embodiments, embeddings layer 625 sends the embedded vectors to sequence generation component 160. Sequence generation component 160 generates a sequence (e.g., sequence 220) from these embedded vectors by dividing the embedded vectors into patches (e.g., patches 212, 214, 216, and 218) and generating embedded patches (e.g., embedded patches 213, 215, 217, and 219) by combining the patches with positional embeddings of the embedded vectors. Further details regarding the operations of sequence generation component 160 are explained with reference to FIG. 2. Sequence generation component 160 sends the sequence generated using the embedded vectors to wavelet transformer component 150.

Wavelet transformer component 160 performs transformation, filtering, and combination operations on the sequence to generate a combined sequence (e.g., combined sequence 240). Further details regarding the operations of wavelet transformer component 150 are explained with reference to FIGS. 3 and 4. Wavelet transformer component 150 sends the combined sequence to probabilistic layer 630 which performs computations on the combined sequence to generate model weights which are updated based on loss 645. Further details regarding the operations of probabilistic layer 630 are explained with reference to probabilistic layer 520 of FIG. 5. By passing the embedded vectors through sequence generation component 160 and wavelet transformer component 150 before entering probabilistic layer 630, model training component 505 reducing the amount of data that needs to be processed by probabilistic layer 630 leading to faster and more efficient computation. Further details regarding operations of actual 635, prediction 640, and loss 645 are explained with reference to actual 525, prediction 530, and loss 535 of FIG. 5.

In some embodiments, if loss 645 exceeds a loss threshold, model training component 505 sends the trained model to model rewriter 545. In other embodiments, if loss 645 exceeds the loss threshold, model training component 505 sends the trained model to a model serving system through network 120.

In some embodiments model rewriter 545 receives the prediction model and rewrites the trained prediction model 550 to generate a new machine learning model with the same structure and weights as the trained model. In some embodiments, model rewriter 545 again rewrites the new machine learning model to generate a machine learning model to be served online. Model rewriter 545 sends the machine learning model to network 120 for distribution and execution.

Figure 7:
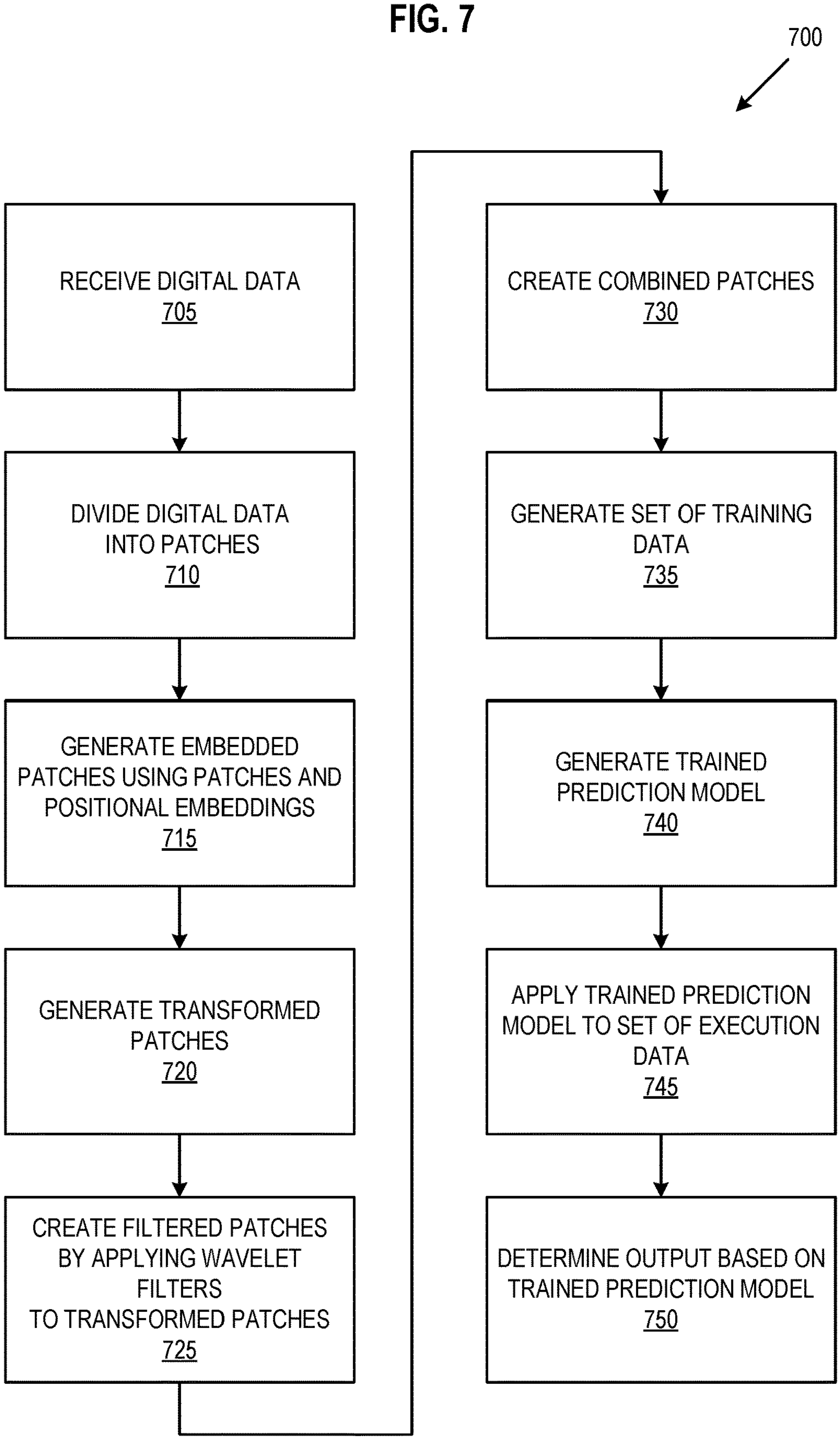
FIG. 7 is a flow diagram of an example method 700 to extract features using scalable wavelet transformers in accordance with some embodiments of the present disclosure.

FIG. 7 is a flow diagram of an example method 700 to extract features using scalable wavelet transformers, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the wavelet transformer component 150 of FIG. 1. In some embodiments, the method 700 is performed by the sequence generation component 160 of FIG. 1. In some embodiments, portions of method 700 are performed by the wavelet transformer component 150 of FIG. 1 and portions of method 700 are performed by sequence generation component 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing device receives digital data. For example, sequence generation component 160 receives digital data 210 which can include one or more of audio, text, image, and/or video data. In some embodiments, the processing device receives the digital data from a data store, such as data store 140 of FIG. 1. In some embodiments, the processing device receives metadata relating to the digital data. The metadata may contain information about the data type of the digital data as well as other aspects of the digital data. For example, the metadata contains information about font sizes for text in the digital data.

At operation 710, the processing device divides the digital data into patches. For example, sequence generation component 160 divides digital data 210 into patches 212, 214, 216, and 218. In some embodiments, the number of patches is predetermined, and the size of the patches depends on the predetermined number of patches and the size of digital data. In other embodiments, the size of the patches is predetermined, and the number of patches depends on the predetermined size of patches and the size of the digital data. Further details regarding the operations of dividing the digital data into patches are explained with reference to FIG. 2.

At operation 715, the processing device generates embedded patches using patches and positional embeddings. For example, sequence generation component 160 performs a positional embedding operation on patches 212, 214, 216, and 218 to determine positional embeddings and combine the positional embeddings with their associated patches to generate embedded patches 213, 215, 217, and 219. Further details regarding the operations of generating embedded patches are explained with reference to FIG. 2.

At operation 720, the processing device generates transformed patches. For example, wavelet transformer component 150 inputs embedded patches 213, 215, 217, and 219 of sequence 220 into first transformer block 305. In some embodiments, the processing device adds a learnable classification embedding to the sequence including the embedded patches before inputting the embedded patches into the transformer block. The transformer block includes a deep learning model that uses self-attention to weigh the significance of the embedded patches with reference to the sequence as a whole. Further details regarding the operations of generating transformed patches are explained with reference to FIG. 3.

At operation 725, the processing device creates filtered patches by applying wavelet filter to transformed patches.

For example, first wavelet block 310 transposes transformed patch 405 and performs matrix multiplication using transformed patch 405 and wavelet filter 420 to compute filtered patch 435. In some embodiments, the processing device creates multiple filtered patches for a single transformed patch by performing matrix multiplication using the transformed patch and multiple wavelet filters. Further details regarding the operations of generating transformed patches are explained with reference to FIG. 4.

At operation 730, the processing device creates combined patches by combining filtered patches. For example, first wavelet block 310 uses softmax or a similar function to convert values in one or more of the filtered patches from numbers to probability values, where the probability values for each number is proportional to the relative scale of each value. In some embodiments, the processing device performs an element-wise product operation of the generated probability matrix with one or more of the other filtered patches. For example, first wavelet block 310 performs a Hadamard product of the probability matrix and a filtered patch to generate a combined patch (e.g., a portion of combined sequence 240 of FIGS. 2 and 3). Further details regarding the operations of creating combined patches are explained with reference to FIG. 4.

At operation 735, the processing device generates a set of training data using the combined patches. For example, model training component 505 generates training data 510 including combined sequence 240 as well as one or more input classifiers identifying digital data 210 that combined sequence 240 was generated from. Further details regarding the operations of generating a set of training data are explained with reference to FIG. 5.

At operation 740, the processing device generates a trained prediction model. For example, model building 515 uses training data 510 as inputs and trains a neural network with hidden layers such as probabilistic layer 520. The processing device generates a prediction for the training data using the probabilistic layer and compares the prediction to the actual classification to generate a loss. The processing device then updates the trained prediction model based on the generated loss. Further details regarding the operations of generating a set of training data are explained with reference to FIGS. 5 and 6.

At operation 745, the processing device applies the trained prediction model to a set of execution data. For example, the processing device uses the execution data as inputs to the trained prediction model. In some embodiments, the processing device inputs execution data into a multitower model such as the model shown in model training component 505 of FIG. 6. Further details regarding the operations of applying the trained prediction model to a set of execution data are explained with reference to FIGS. 5 and 6.

At operation 750, the processing device determines output based on the trained prediction model. For example, the processing device determines one or more output classifiers for execution data based on the output of the trained prediction model. In some embodiments, the processing device determines an output from a multitower prediction model such as the model shown in model training component 505 of FIG. 6. For example, the multitower model is a recommender system which uses the classification of execution data (e.g., input features 605 of FIG. 6) as part of a larger machine learning model which forms a recommendation using the classification. In such an example, the recommendation model may use classification information from a wavelet tower (e.g., wavelet tower 615 of FIG. 6) to determine that a picture is of a certain breed of dog, use information from a deep tower (e.g., deep tower 620 of FIG. 6) to identify that a user has previous positive interactions with pictures of animals and/or dogs, use information from a wide tower (e.g., wide tower 610 of FIG. 6) to identify that a user has previous positive interactions with pictures of the certain breed of dog, and therefore recommend the picture of the certain breed of dog to the user. Further details regarding the operations determining the output based on the trained prediction model are explained with reference to FIGS. 5 and 6.

Figure 8:
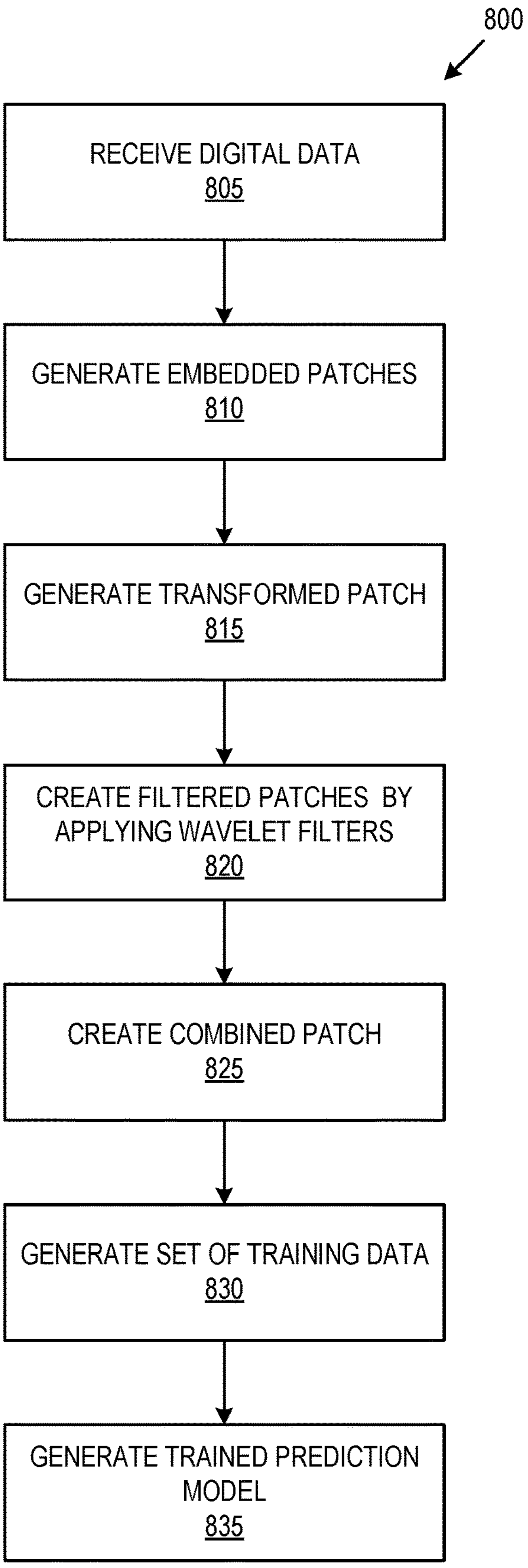
FIG. 8 is a flow diagram of an example method 800 to extract features using scalable wavelet transformers in accordance with some embodiments of the present disclosure.

FIG. 8 is a flow diagram of an example method 800 to extract features using scalable wavelet transformers, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the wavelet transformer component 150 of FIG. 1. In some embodiments, the method 800 is performed by the sequence generation component 160 of FIG. 1. In some embodiments, portions of method 800 are performed by the wavelet transformer component 150 of FIG. 1 and portions of method 800 are performed by sequence generation component 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the processing device receives digital data. For example, sequence generation component 160 receives digital data 210 which can include one or more of audio, text, image, and/or video data. In some embodiments, the processing device receives the digital data from a data store, such as data store 140 of FIG. 1. In some embodiments, the processing device receives metadata relating to the digital data. The metadata may contain information about the data type of the digital data as well as other aspects of the digital data. For example, the metadata contains information about font sizes for text in the digital data.

At operation 810, the processing device generates embedded patches. For example, sequence generation component 160 divides digital data 210 into patches 212, 214, 216, and 218 and performs a positional embedding operation on patches 212, 214, 216, and 218 to determine positional embeddings and combine the positional embeddings with their associated patches to generate embedded patches 213, 215, 217, and 219. Further details regarding the operations of generating embedded patches are explained with reference to FIG. 2.

At operation 815, the processing device generates a transformed patch. For example, wavelet transformer component 150 inputs embedded patches 213, 215, 217, and 219 of sequence 220 into first transformer block 305. In some embodiments, the processing device adds a learnable classification embedding to the sequence including the embedded patches before inputting the embedded patches into the transformer block. The transformer block includes a deep learning model that uses self-attention to weigh the significance of the embedded patches with reference to the sequence as a whole. Further details regarding the operations of generating transformed patches are explained with reference to FIG. 3.

At operation 820, the processing device creates filtered patches by applying wavelet filters. For example, first wavelet block 310 transposes transformed patch 405 and performs matrix multiplication using transformed patch 405 and wavelet filter 420 to compute filtered patch 435. In some embodiments, the processing device creates multiple filtered patches for a single transformed patch by performing matrix multiplication using the transformed patch and multiple wavelet filters. Further details regarding the operations of generating transformed patches are explained with reference to FIG. 4.

At operation 825, the processing device creates a combined patch. For example, first wavelet block 310 uses softmax or a similar function to convert values in one or more of the filtered patches from numbers to probability values, where the probability values for each number is proportional to the relative scale of each value. In some embodiments, the processing device performs an element-wise product operation of the generated probability matrix with one or more of the other filtered patches. For example, first wavelet block 310 performs a Hadamard product of the probability matrix and a filtered patch to generate a combined patch (e.g., a portion of combined sequence 240 of FIGS. 2 and 3). Further details regarding the operations of creating combined patches are explained with reference to FIG. 4.

At operation 830, the processing device generates a set of training data. For example, model training component 505 generates training data 510 including combined sequence 240 as well as one or more input classifiers identifying digital data 210 that combined sequence 240 was generated from. Further details regarding the operations of generating a set of training data are explained with reference to FIG. 5.

At operation 835, the processing device generates a trained prediction model. For example, model building 515 uses training data 510 as inputs and trains a neural network with hidden layers such as probabilistic layer 520. The processing device generates a prediction for the training data using the probabilistic layer and compares the prediction to the actual classification to generate a loss. The processing device then updates the trained prediction model based on the generated loss. Further details regarding the operations of generating a set of training data are explained with reference to FIGS. 5 and 6.

FIG. 9 illustrates an example machine of a computer system 900 within which a set of instructions, for causing the machine to perform any one or more of the methodologies discussed herein, can be executed. In some embodiments, the computer system 900 can correspond to a component of a networked computer system (e.g., the computer system 100 of FIG. 1) that includes, is coupled to, or utilizes a machine to execute an operating system to perform operations corresponding to wavelet transformer component 150 of FIG. 1 and/or sequence generation component 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a memory 906 (e.g., flash memory, static random access memory (SRAM), etc.), an input/output system 910, and a data storage system 940, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 912 for performing the operations and steps discussed herein.

The computer system 900 can further include a network interface device 908 to communicate over the network 920. Network interface device 908 can provide a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation network interface device 908 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 900.

Computer system 900 can send messages and receive data, including program code, through the network(s) and network interface device 908. In the Internet example, a server can transmit a requested code for an application program through the Internet and network interface device 908. The received code can be executed by processing device 902 as it is received, and/or stored in data storage system 940, or other non-volatile storage for later execution.

The input/output system 910 can include an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, and/or digital imagery, for example.

The data storage system 940 can include a machine-readable storage medium 942 (also known as a computer-readable medium) on which is stored one or more sets of instructions 912 or software embodying any one or more of the methodologies or functions described herein. The instructions 912 can also reside, completely or at least partially, within the main memory 904 and/or within the processing device 902 during execution thereof by the computer system 900, the main memory 904 and the processing device 902 also constituting machine-readable storage media.

In one embodiment, the instructions 912 include instructions to implement functionality corresponding to a wavelet transformer component (e.g., the wavelet transformer component 150 of FIG. 1). In another embodiment, the instructions 912 include instructions to implement functionality corresponding to a sequence generation component (e.g., the sequence generation component 150 of FIG. 1). In yet another embodiment, the instructions 912 include instructions to implement functionality corresponding to both a wavelet transformer component (e.g., the wavelet transformer component 150 of FIG. 1) and a sequence generation component (e.g., the sequence generation component 150 of FIG. 1). While the machine-readable storage medium 942 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, images, audio, videos or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, 200, 500, and/or 600, can carry out the computer-implemented methods 700 and 800 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes receiving digital data, generating embedded patches using the digital data, generating a transformed patch by applying a transformer block to an embedded patch of the embedded patches, creating a filtered patches for the transformed patch by applying wavelet filters to the transformed patch, creating a combined patch by combining the filtered patches, generating a set of training data using the combined patch, and generating a trained prediction model by applying a prediction model to the set of training data.

An example 2 includes the subject matter of example 1 where generating the embedded patches includes dividing the digital data into patches and generating the embedded patches by combining the patches with positional embeddings for the patches. An example 3 includes the subject matter of example 2, where the digital data includes metadata and dividing the digital data into the patches uses the metadata to determine a patch size of a patch. An example 4 includes the subject matter of example 3, where the metadata includes a data type including at least one of text, audio, image, or video and where dividing the digital data into the patches uses the data type to determine the patch size. An example 5 includes the subject matter of any of examples 1-4, further including generating the wavelet filters, where a wavelet filter of the wavelet filters includes a first filter dimension and a second filter dimension, the transformed patch includes a first patch dimension and a second patch dimension, and a size of the second filter dimension is less than a size of the first patch dimension. An example 6 includes the subject matter of example 5, where the size of the second filter dimension is half the size of the first patch dimension and where generating the wavelet filter includes determining a first filter value and a second filter value and generating a diagonal constant matrix with the first filter value and the second filter value on diagonals of the diagonal constant matrix. An example 7 includes the subject matter of example 6, further including determining one or both of the first filter value and the second filter value based on an output of the trained prediction model. An example 8 includes the subject matter of any of examples 6 and 7, where the wavelet filters include a first wavelet filter and a second wavelet filter, the method further including generating the first wavelet filter as a high pass wavelet filter, generating the second wavelet filter as a low pass wavelet filter, where the filtered patches include a first filtered patch, created by applying the first wavelet filter to the transformed patch and a second filtered patch, created by applying the second wavelet filter to the transformed patch, and creating a combined patch by combining the first filtered patch and the second filtered patch. An example 9 includes the subject matter of example 8, where creating the combined patch includes converting the first filtered patch into a filtered probability patch, where probability values of the filtered probability patch are proportional to a scale of values of the first filtered patch and creating the combined patch by applying an element-wise product operation to the filtered probability patch and the second filtered patch. An example 10 includes the subject matter of any of examples 1-9, where the digital data is identified by one or more input classifiers and generating the set of training data further uses the one or more input classifiers, the method further including applying the trained prediction model to a set of execution data and determining, by the trained prediction model, an output based on the set of execution data, where the output includes one or more output classifiers identifying the set of execution data.

An example 11 includes a system including at least one memory device and a processing device operatively coupled with the at least one memory device, the processing device to receive digital data, generate embedded patches using the digital data, generate a transformed patch by applying a transformer block to an embedded patch of the embedded patches, create filtered patches for the transformed patch by applying wavelet filters to the transformed patch, create a combined patch by combining the filtered patches, generate a set of training data using the combined patch, and generate a trained prediction model by applying a prediction model to the set of training data.

An example 12 includes the subject matter of example 11 where generating the embedded patches includes dividing the digital data into patches and generating the embedded patches by combining the patches with positional embeddings for the patches. An example 13 includes the subject matter of example 12, where the digital data includes metadata and dividing the digital data into the patches uses the metadata to determine a patch size of a patch. An example 14 includes the subject matter of example 13, where the metadata includes a data type including at least one of text, audio, image, or video and where dividing the digital data into the patches uses the data type to determine the patch size. An example 15 includes the subject matter of any of examples 11-14, where the processing device is further to generate the wavelet filters, where a wavelet filter of the wavelet filters includes a first filter dimension and a second filter dimension, the transformed patch includes a first patch dimension and a second patch dimension, and a size of the second filter dimension is less than a size of the first patch dimension. An example 16 includes the subject matter of example 15, where the size of the second filter dimension is half the size of the first patch dimension and where generating the wavelet filter includes determining a first filter value and a second filter value and generating a diagonal constant matrix with the first filter value and the second filter value on diagonals of the diagonal constant matrix. An example 17 includes the subject matter of example 16, where the processing device is further to determine one or both of the first filter value and the second filter value based on an output of the trained prediction model. An example 18 includes the subject matter of any of examples 16 and 17, where the wavelet filters include a first wavelet filter and a second wavelet filter and where the processing device is further to generate the first wavelet filter as a high pass wavelet filter, generate the second wavelet filter as a low pass wavelet filter, where the filtered patches include a first filtered patch, created by applying the first wavelet filter to the transformed patch and a second filtered patch, created by applying the second wavelet filter to the transformed patch, and create a combined patch by combining the first filtered patch and the second filtered patch. An example 19 includes the subject matter of example 18, where creating the combined patch includes converting the first filtered patch into a filtered probability patch, where probability values of the filtered probability patch are proportional to a scale of values of the first filtered patch and creating the combined patch by applying an element-wise product operation to the filtered probability patch and the second filtered patch.

An example 20 includes a system including at least one memory device and a processing device operatively coupled with the at least one memory device, the processing device to receive digital data, where the digital data is identified by one or more input classifiers, generate embedded patches using the digital data, generate a transformed patch by applying a transformer block to an embedded patch of the embedded patches, create filtered patches for the transformed patch by applying wavelet filters to the transformed patch, create a combined patch by combining the filtered patches, generate a set of training data using the combined patch and the one or more input classifiers, apply the trained prediction model to a set of execution data, and determine, by the trained prediction model, an output based on the set of execution data, wherein the output includes one or more output classifiers identifying the set of execution data.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving digital data;

generating a plurality of embedded patches using the digital data;

generating a transformed patch by applying a transformer block to an embedded patch of the plurality of embedded patches;

creating a plurality of filtered patches for the transformed patch by applying a plurality of wavelet filters to the transformed patch, wherein the plurality of filtered patches includes a first filtered patch created by applying a first wavelet filter of the plurality of wavelet filters and a second filtered patch created by applying a second wavelet filter of the plurality of wavelet filters;

converting the first filtered patch into a filtered probability patch, wherein probability values of the filtered probability patch are proportional to a scale of values of the first filtered patch;

creating a combined patch by combining the plurality of filtered patches including the filtered probability patch and the second filtered patch;

generating a set of training data using the combined patch; and generating a trained prediction model by applying a prediction model to the set of training data.

2. The method of claim 1, wherein generating the plurality of embedded patches comprises:

dividing the digital data into a plurality of patches; and generating the plurality of embedded patches by combining the plurality of patches with a plurality of positional embeddings for the plurality of patches.

3. The method of claim 2, wherein the digital data comprises metadata and dividing the digital data into the plurality of patches uses the metadata to determine a patch size of a patch of the plurality of patches.

4. The method of claim 3, wherein the metadata comprises a data type comprising at least one of text, audio, image, or video and wherein dividing the digital data into the plurality of patches uses the data type to determine the patch size.

5. The method of claim 1, further comprising:

generating the plurality of wavelet filters, wherein a wavelet filter of the plurality of wavelet filters comprises a first filter dimension and a second filter dimension, the transformed patch comprises a first patch dimension and a second patch dimension, and a size of the second filter dimension is less than a size of the first patch dimension.

6. The method of claim 5, wherein the size of the second filter dimension is half the size of the first patch dimension and wherein generating the wavelet filter of the plurality of wavelet filters comprises:

determining a first filter value and a second filter value; and generating a diagonal constant matrix with the first filter value and the second filter value on diagonals of the diagonal constant matrix.

7. The method of claim 6, further comprising:

determining one or both of the first filter value and the second filter value based on an output of the trained prediction model.

8. The method of claim 6, further comprising:

generating the first wavelet filter as a high pass wavelet filter; and generating the second wavelet filter as a low pass wavelet filter.

9. The method of claim 8, wherein creating the combined patch comprises:

creating the combined patch by applying an element-wise product operation to the filtered probability patch and the second filtered patch.

10. The method of claim 1, wherein the digital data is identified by one or more input classifiers and generating the set of training data further uses the one or more input classifiers, the method further comprising:

applying the trained prediction model to a set of execution data; and determining, by the trained prediction model, an output based on the set of execution data, wherein the output comprises one or more output classifiers identifying the set of execution data.

11. A system comprising:

at least one memory device; and a processing device, operatively coupled with the at least one memory device, to:

receive digital data;

generate a plurality of embedded patches using the digital data;

generate a transformed patch by applying a transformer block to an embedded patch of the plurality of embedded patches;

create a plurality of filtered patches for the transformed patch by applying a plurality of wavelet filters to the transformed patch, wherein the plurality of filtered patches includes a first filtered patch created by applying a first wavelet filter of the plurality of wavelet filters and a second filtered patch created by applying a second wavelet filter of the plurality of wavelet filters;

convert the first filtered patch into a filtered probability patch, wherein probability values of the filtered probability patch are proportional to a scale of values of the first filtered patch;

create a combined patch by combining the plurality of filtered patches including the filtered probability patch and the second filtered patch;

generate a set of training data using the combined patch; and generate a trained prediction model by applying a prediction model to the set of training data.

12. The system of claim 11, wherein the processing device is further to:

divide the digital data into a plurality of patches; and generate the plurality of embedded patches by combining the plurality of patches with a plurality of positional embeddings for the plurality of patches.

13. The system of claim 12, wherein the digital data comprises metadata and dividing the digital data into the plurality of patches uses the metadata to determine a patch size of a patch of the plurality of patches.

14. The system of claim 13, wherein the metadata comprises a data type comprising at least one of text, audio, image, or video and wherein dividing the digital data into the plurality of patches uses the data type to determine the patch size.

15. The system of claim 11, wherein the processing device is further to:

generate the plurality of wavelet filters, wherein a wavelet filter of the plurality of wavelet filters comprises a first filter dimension and a second filter dimension, the transformed patch comprises a first patch dimension and a second patch dimension, and a size of the second filter dimension is less than a size of the first patch dimension.

16. The system of claim 15, wherein the size of the second filter dimension is half the size of the first patch dimension and wherein the processing device is further to:

determine a first filter value and a second filter value; and generate a diagonal constant matrix with the first filter value and the second filter value on diagonals of the diagonal constant matrix.

17. The system of claim 16, wherein the processing device is further to:

determine one or both of the first filter value and the second filter value based on an output of the trained prediction model.

18. The system of claim 16, wherein the processing device is further to:

generate the first wavelet filter as a high pass wavelet filter; and generate the second wavelet filter as a low pass wavelet filter.

19. The system of claim 18, wherein the processing device is further to:

create the combined patch by applying an element-wise product operation to the filtered probability patch and the second filtered patch.

20. A system comprising:

at least one memory device; and a processing device, operatively coupled with the at least one memory device, to:

receive digital data identified by one or more input classifiers;

generate a plurality of embedded patches using the digital data;

generate a transformed patch by applying a transformer block to an embedded patch of the plurality of embedded patches;

create a plurality of filtered patches for the transformed patch by applying a plurality of wavelet filters to the transformed patch, wherein the plurality of filtered patches includes a first filtered patch created by applying a first wavelet filter of the plurality of wavelet filters and a second filtered patch created by applying a second wavelet filter of the plurality of wavelet filters;

convert the first filtered patch into a filtered probability patch, wherein probability values of the filtered probability patch are proportional to a scale of values of the first filtered patch;

create a combined patch by combining the plurality of filtered patches including the filtered probability patch and the second filtered patch;

generate a set of training data using the combined patch and the one or more input classifiers;

generate a trained prediction model by applying a prediction model to the set of training data;

apply the trained prediction model to a set of execution data; and determine, by the trained prediction model, an output based on the set of execution data, wherein the output comprises one or more output classifiers identifying the set of execution data.

* * * * *